United States Patent Office 3,391,135
Patented July 2, 1968

3,391,135
PROCESS FOR THE MANUFACTURE OF LOW MOLECULAR WEIGHT CELLULOSE DERIVATIVES
Shigeru Ouno, Kanagawa-ken, Masayuki Tonedachi, Tokyo, Shunichi Koyanagi, Niigata-ken, and Kenichi Ito, Tokyo, Japan, assignors to Shin-Etsu Chemical Industry Co., Ltd., Tokyo, Japan
No Drawing. Filed Oct. 18, 1965, Ser. No. 497,505
Claims priority, application Japan, Oct. 26, 1964, 39/60,707
6 Claims. (Cl. 260—214)

ABSTRACT OF THE DISCLOSURE

A process for manufacturing low molecular weight cellulose esters or ethers from high molecular weight cellulose esters or ethers, which are in powder form and have less than 5% water content, by treating them at temperatures ranging from 30 to 80° C. with not more than 5% by weight, calculated on the cellulose derivative, of an anhydrous hydrogen halide, which is then removed from the treated mixture. The so-obtained cellulose derivatives can be advantageously employed as coating materials for pharmaceutical and agricultural chemicals, e.g. for tables, paints and film-forming raw materials.

SUMMARY OF THE INVENTION

This invention generally relates to cellulose and cellulose derivatives and is particularly directed to a method of preparing cellulose derivatives of very low molecular weight. The 2%, by weight, solution of the cellulose derivatives prepared in accordance with this invention should thus exhibit a viscosity less than 10 cps. at 20° C.

Various processes and methods have been suggested for reducing the molecular weight of cellulose derivatives. According to one of the customary prior art methods, the polymerization degree of a cellulose or its derivative is reduced by cleaving an ether bond between the anhydro glucose rings which compose the cellulose unit. This is ordinarily accomplished by acid catalysed hydrolysis with acid. It has also been suggested to cleave or split the main structural molecular chain of the cellulose by oxidative methods, i.e. an air treatment or by reacting it with a peroxide. Mechanical processes for cleaving or splitting the bonds have also been proposed.

However, the prior art methods as referred to hereinabove are difficult to perform in practice and are uneconomical and, for this reason, they have not generally been accepted by the industry. No satisfactory process is known by means of which high molecular weight cellulose derivatives can be economically split into low molecular weight derivatives in a satisfactory manner. The prior art mechanical processes for effecting the bond cleavage are exceedingly inefficient and therefore have not been successfully employed in large scale operations. In addition, mechanical cleavage does not result in cellulose derivatives of very low molecular weight. The oxidative processes, in turn, particularly the air oxidation processes, proceed very slowly so that they are very uneconomical. Cleavage processes which are effected by subjecting the cellulose derivatives to a peroxide treatment proceed relatively quickly, so that from this point of view they are comparatively economical. However, as is well known, peroxide cleavage processes are difficult to perform because of the removal of residual undecomposed peroxide which tends to remain in the reaction product. From a practical point of view, it is almost impossible to remove the entire amount of undecomposed peroxide quantitatively from the reaction product, which seriously affects the quality of the final product. For this reason, peroxide cleavage processes and, for that matter, cleavage processes by other oxidizing agents, have not met with commercial success.

It should also be considered that splitting or cleaving of the main chain of the cellulose by means of peroxides or other oxidizing agents customarily results in undesired side effects which seriously affect the success of the operation. It is thus known that the anhydro glucose ring proper, which composes the cellulose unit, may be cleaved in oxidative manner to form an aldehyde group, or a carbonyl group may be formed. These side reactions tend to color the final reaction product and generally negatively affect the characteristics of the end product, thereby considerably reducing its commercial value. These prior art processes are carried out in a liquid medium which, again, renders the procedure more difficult, as the viscosity of the solution is very high at the beginning so that the reaction has to be carried out at an inefficient low concentration.

Accordingly, it is a primary object of the present invention to overcome the disadvantages of the prior art processes and to provide a process for splitting a cellulose derivative of relatively high molecular weight to obtain a cellulose derivative of exceedingly low molecular weight.

Another object of the invention is to provide a process of the indicated kind which does not make use of oxidation agents or mechanical cleavage processes, which is simple to carry out, and which yields cellulose derivatives of exceedingly low molecular weight at high yields.

Generally, it is an object of this invention to improve the art of preparing low molecular weight cellulose derivatives and the art of splitting high molecular weight cellulose derivatives into low molecular weight cellulose derivatives as presently practiced.

Briefly, in accordance with this invention a cellulose derivative of high molecular weight is reacted with a hydrogen halide gas at a temperature not exceeding 80° C. After the reaction hydrogen halide is removed by evaporation and, if necessary, the product is neutralized with a weak base. The cellulose derivative is supplied to the reaction in comminuted or powder form and is generally in the state in which it is available after the conventional processes of production of the cellulose industry. The cellulose derivatives of very low molecular weight which are thus obtained do not exhibit any change in their chemical structure or composition as compared to the starting material, such as formation of carbonyl bonds or the like. Moreover, the yield is excellent and the final product is colorless.

A large variety of cellulose derivatives of relatively high molecular weight can be subjected to the inventive cleavage process. Thus, the cellulose derivatives used in the present invention may be optionally selected from the group consisting of alkyl celluloses such as methyl cellulose and ethyl cellulose, hydroxyalkyl celluloses having a hydroxyl group as a substituent, such as hydroxyethyl cellulose and hydroxypropyl celluose, celulose esters such as acetyl cellulose, cellulose butyrate and cellulose phthalate, carboxylalkyl celluloses which have a carboxyl group as a substituent, such as carboxymethyl cellulose or mixed substituted celluloses of one or more than two kinds of the above substituents, for example, methylhydroxyethyl cellulose, methylethyl cellulose, methylhydroxypropyl cellulose, and acetylpropyl cellulose, and mixtures thereof.

The hydrogen halide used for the purpose of the present invention is selected from the group consisting of hydrogen fluoride, hydrogen chloride, hydrogen bromide and hydrogen iodide.

From a practical point of view, hydrogen chloride is the preferred hydrogen halide, since the hydrogen chloride has the most advantageous characteristics for the purposes of this invention when considering reactivity, corrosion and other problems connected with the reactor materials, volatility, stability of the hydrogen halide against decomposition, and cost. However, it is perfectly feasible to carry out the inventive process with other hydrogen halides as enumerated above.

Care should be taken to avoid excess amounts of hydrogen halide, since these render the removal of the halide upon completion of the reaction more difficult. Moreover, large excess of halide has a tendency to discolor the reaction product. Extensive tests have indicated that the amount of hydrogen halide for the inventive purposes should be preferably less than 5%, preferably about 2%, by weight, of the amount of the cellulose derivative to be treated.

The hydrogen halide may be introduced into the reactor in the form of a gas or as a solution, for example, dissolved in a small amount of an alcohol having less than 6 carbon atoms. Such alcohols are, for example, methyl alcohol and ethyl alcohol, in which the cellulose derivative starting material is maintained in powder form.

As previously set forth, the inventive process should be performed at a reaction temperature not exceeding 80° C., at which the hydrogen halide is maintained in the gaseous state and does not condense. Higher temperatures than 80° C. should be avoided in order to prevent discoloration of the reaction product. Moreover, higher temperatures tend to cause the reaction product to become rubbery or sticky, and the yield is also considerably decreased. The preferred reaction temperature is about between 30–60° C. However, at such temperatures the particular hydrogen halide used may not be sufficiently gasified and, for this reason, it is recommended to maintain the reaction system under a reduced pressure. It is also advantageous if the reactor is agitated during the reaction, which facilitates uniform and homogeneous reaction.

The amount of water in the reactants should be as low as possible. From a practical point of view, it has been established that the water content in the reaction system should be less than about 5%. Higher amounts of water tend to accelerate the reaction too rapidly in local areas of the reactor, which then tend to form a colored sticky or rubbery product, a fact which moreover decreases the yield.

Pursuant to the invention, the low molecular weight cellulose derivative obtained after the treatment with the hydrogen halide is dried in customary manner, and in this manner almost all volatile hydrogen halide is liberated and removed. If necessary, the reaction product may be further admixed with a weak base, such as, for example, sodium bicarbonate, in order to convert any residual hydrogen halide into a neutral salt. In most instances, however, the hydrogen halide will quantitatively escape during the drying treatment.

The cellulose derivatives of very low molecular weight as obtained pursuant to this invention can be advantageously employed in many areas in which customary prior art cellulose derivatives cannot be used due to their high molecular weight and the high viscosity of the solution. Examples of such areas or fields are coating materials for pharmaceutical or agricultural chemicals, coating materials for tablets, paints, and film-forming raw materials.

The invention will now be described by several examples, it being understood, however, that these examples are given by way of illustration and not by way of limitation and that many changes may be effected without affecting in any way the scope and spirit of this invention as recited in the appended claims.

Example I

This experiment was carried out with 10 kilograms of methyl cellulose powder of a water content of 1.2%. Its maximum particle size was about 360μ, and a 2%, by weight, aqueous solution of this methyl cellulose powder exhibited a viscosity of 65 cps. at 20° C. The 10 kilograms of the methyl cellulose powder were then placed in a glass-lined reaction vessel. The powder was agitated with a glass-lined mixer and hydrogen chloride was introduced into the reaction vessel. The amount of the hydrogen chloride was 1.2%, by weight, calculated on the amount of methyl cellulose. The vessel was gradually heated in a water bath so that the temperature within the reaction vessel was maintained at about 40° C. After 3 hours and 20 minutes, the viscosity of the methyl cellulose was reduced to 4.8 cps. at 20° C. in a 2% solution. The contents were then removed from the reaction vessel and were dried overnight in an air stream of 60° C. 9.8 kilograms of pure white methyl cellulose powder of extremely low molecular weight were obtained.

Example II

This experiment was carried out with 20 kilograms of methyl-hydroxypropyl cellulose having a water content of 1.4%. A 2%, by weight, solution of this cellulose derivative exhibited a viscosity of 50 cps. at 20° C. 2 kilograms of anhydrous methanol containing 10% of hydrogen chloride were supplied to the methylhydroxypropyl cellulose in a reaction vessel of similar construction as described in connection with Example I. The treatment was effected at 50° C. for 3 hours, whereby the molecular weight of the cellulose derivatives was reduced to 6.3 cps. at 20° C. in a 2% solution. Upon completion of the reaction, the product was dried overnight and 5 grams of sodium bicarbonate powder were added and the mixture was agitated in a blender. 19.4 kilograms of methyl-hydroxypropyl cellulose of very low molecular weight were obtained.

While specific embodiments of the invention have been shown and described in detail to illustrate the application of the inventive principles, it will be understood that the invention may be embodied otherwise without departing from such principles.

What is claimed is:

1. A method of manufacturing low molecular weight cellulose derivatives, a 2% by weight solution of which exhibits a viscosity of less than 10 cps. at 20° C., which comprises treating high molecular weight cellulose derivatives selected from the group consisting of cellulose organic esters and ethers in powder form and with less than 5% water content, with not more than 5% by weight, calculated on the basis of the cellulose derivatives, of an anhydrous hydrogen halide at a temperature of about 30° C. to 80° C., and removing thereafter the hydrogen halide from the treated mixture.

2. The process as claimed in claim 1, wherein a weak base is added to the cellulose derivative powder after the removal of said hydrogen halide.

3. The process as claimed in claim 1, wherein said hydrogen halide is hydrogen chloride.

4. The process as claimed in claim 1, wherein said high molecular weight cellulose derivatives have a molecular weight which exhibits viscosity of at least 50 cps. at 20° C. when in 2% by weight solution.

5. The method as claimed in claim 1, wherein said hydrogen halide is dissolved in an anhydrous aliphatic alcohol at a temperature of from 30° C. to 80° C.

6. The process as claimed in claim 5, wherein said aliphatic alcohol has not more than 6 carbon atoms.

References Cited

UNITED STATES PATENTS 3,175,928    3/1965    Lancaster et al. _____ 127—38

DONALD E. CZAJA, *Primary Examiner.*

R. W. MULCAHY, *Assistant Examiner.*